Patented Oct. 17, 1950

2,526,439

UNITED STATES PATENT OFFICE 2,526,439

COATING COMPOSITIONS

Jack T. Thurston, Riverside, Conn., assignor to American Cyanamid Company, New York, N. Y., a corporation of Maine No Drawing. Application December 23, 1946, Serial No. 718,129

8 Claims. (Cl. 260—68)

This invention relates to urea-aldehyde coating compositions having accelerators incorporated therein, and more particularly, it is directed to phosphoric acid derivatives of hydroxy aliphatic esters incorporated in amino-plastic compositions to accelerate the cure thereof.

These new accelerator compositions are more soluble in hydrocarbon solvents than previously employed accelerators, and when subjected to heat they decompose into phosphoric acids and the corresponding unsaturated aliphatic esters, which in turn may undergo polymerization.

As examples of hydroxy esters, there may be mentioned ethyl lactate, glycolate, α-hydroxy isobutyrate, hydracrylate, tartrate and citrate, which are satisfactory for use in preparing phosphates or pyrophosphates that are suitable accelerators for acid-convertible urea-aldehyde resins in coating compositions. The relatively low molecular weight hydroxy aliphatic esters have proven to be the most desirable.

As examples of processes for producing suitable accelerators of this type, the following illustrations are given.

Example 1

142 parts of phosphorus pentoxide were added to 500 parts of benzene in a suitable vessel equipped for stirring. To this slurry there was slowly added 354 parts of ethyl lactate, care being taken to keep the temperature below 40° C. by occasional cooling in ice water. When all of the ethyl lactate had been added, there was some solid adhering to the side of the reaction vessel, but this dissolved on stirring for approximately an hour. This solution was satisfactorily employed as an accelerator for urea-aldehyde coating compositions.

Example 2

142 parts of phosphorus pentoxide were added to 620 parts of benzene in a suitable reaction vessel. To this slurry there was slowly added 236 parts of ethyl lactate, care being taken to keep the temperature below 40° C. After several hours of stirring, the solid was completely dissolved. This solution was satisfactorily employed as an accelerator for urea-aldehyde coating compositions.

Example 3

142 parts of phosphorus pentoxide were added to 385 parts of benzene in a suitable reaction vessel. To this slurry there was slowly added 472 parts of ethyl lactate, care being taken to keep the temperature below 40° C. After a short stirring period, the solid was completely dissolved. This solution was satisfactorily employed as an accelerator for urea-aldehyde coating compositions.

Example 4

142 parts of phosphorus pentoxide were added to 622 parts of benzene in a suitable reaction vessel. To this slurry there was slowly added, while stirring, 236 parts of ethyl hydracrylate, care being taken to keep the temperature below 40° C. Two liquid phases were formed, which, upon the addition of 15.0 cc. of dioxane, gave an homogeneous solution. This solution gave satisfactory results as an accelerator for urea-aldehyde coating compositions.

Urea-aldehyde resin such as urea-formaldehyde condensation products dissolved or dispersed in an inert diluent such as benzene, xylene and toluene type, generally form brittle surfaces when cured. Accordingly, a compatible alkyd resin is usually blended therewith to produce coating composition having improved toughness. The oil modified alkyd resins tend to give better compatibility and, therefore, they are usually employed as modifiers for the urea-aldehyde coating compositions. To illustrate the application of these accelerators to urea-aldehyde coating compositions, a composition was prepared by blending equal portions of resin A and resin B, prepared according to the following procedures:

A 3370 parts of 37% formaldehyde solution were charged to a suitable reaction vessel and neutralized to pH 8.6 with 20% sodium hydroxide, and there were then added 6 parts of 85% phosphoric acid. The mixture was heated to 70° C. and 1200 parts of urea were added over a period of an hour. The mixture was then heated to 85° C. and held at that temperature for one hour. 1340 parts of butanol were added and the mixture heated to reflux and held for one hour at reflux. 1550 more parts of butanol were added and the mixture distilled with replacing feed of dry butanol until a batch temperature of 112° C. was reached. The batch was then vacuum concentrated at 90° C. to approximately 65% resin solids. This solution was diluted with xylene and butanol to give a final composition of 20% xylene, 30% butanol and 50% resin solids.

B

One mol of phthalic acid, 0.56 mol of soya fatty acids, and 1 mol of 100% glycerine were heated to 220° C. and held at that temperature for 4 hours. The reaction mixture was then diluted with xylene to form a solution containing 70% resin solids.

This coating composition, obtained by mixing equal portions of these resin dispersions, was blended with accelerators of the type described above in varying portions to obtain rapidly cured surfaces according to the following examples:

*Example 5*

To 100 parts of the coating composition, there was added 5 parts of the accelerator prepared by Example 1. This coating composition was then applied to steel panels, some of which were heated for 2 hours at 140° F., and the others heated for 5 minutes at 250° F. In all cases, relatively hard, tough, scratch-resistant surfaces were obtained.

*Example 6*

To 100 parts of coating composition, there was added 2 parts of accelerator prepared according to the procedure of Example 1. This coating composition was applied to steel panels. Some of these panels were heated for 2 hours at 140° F., and the others were heated for 5 minutes at 150° F. All the surfaces obtained were good with respect to hardness, toughness and scratch-resistance. However, the surfaces obtained by heating for 5 minutes at 150° F. appeared to be superior to those obtained by heating for the longer period of time at slightly lower temperatures.

*Example 7*

To 100 parts of coating composition there was added 5 parts of the accelerator prepared by the process described in Example 2. This composition was applied to panels and subjected to the same treatment as those described in Example 5. A substantially improved surface was obtained with respect to toughness, hardness, scratch-resistance and gloss.

*Example 8*

To 100 parts of coating composition there was added and blended 2.7 parts of accelerator prepared according to the procedure of Example 2. This composition was applied to steel panels which were cured according to the procedure outlined in Example 6. Surfaces having good hardness, toughness, and scratch-resistance were obtained.

*Example 9*

To 100 parts of coating composition, there was added 5 parts of accelerator prepared according to the procedure outlined in Example 3. This composition was applied to steel panels which were subjected to the same conditions outlined in Example 5. Hard, tough, scratch-resistant, glossy surfaces were obtained.

*Example 10*

To 100 parts of coating composition there was added 1.6 parts of accelerator prepared according to the procedure of Example 3. This composition was applied to steel panels which were subjected to the same treatment of cure as outlined in Example 6. Panels were obtained with this composition having surfaces of improved hardness, toughness and scratch-resistance.

Examples 7 and 8 were repeated, using an accelerator prepared by the process of Example 4 in place of the accelerator prepared by Example 2. Panels having substantially the same surfaces were obtained with this accelerator as were obtained in those examples.

Other compositions employing melamine-formaldehyde resin in place of urea-formaldehyde resin gave comparable results. An example of this type aminoplastic resin is as follows: approximately 5 mols of formaldehyde and 1 mol of melamine were reacted according to well-known procedures with acid, butanol and xylene, dehydrated and diluted with butanol and xylene to obtain a syrup containing 50% resin solids. Other molecular proportions of the reactants give suitable resins, for example, the ratio of formaldehyde to melamine may vary from 3:1 to 6:1.

Surfaces having good toughness, hardness, and scratch-resistance, as well as rubbing properties have been obtained by incorporating 1 to 5 parts of these accelerators in 100 parts aminoplastic coating compositions compounded or formulated for wood finishes. These compositions were applied to wood panels and heated for approximately 2 hours at 120° F., sanded, coated with a second application of the composition, and reheated for 2 hours at 120° F. Surfaces obtained in this manner could be rubbed or buffed within an hour after the final curing.

The examples given herein are wholly for the purpose of illustrating the invention, and are in no way to be construed as limiting the invention.

I claim:

1. A coating composition comprising an urea-aldehyde resin in a volatile organic dispersion medium, an oil modified alkyd resin dispersion, and 0.2–5% of a phosphorus pentoxide derivative of ethyl lactate.

2. A coating composition comprising an aminoplastic resin selected from the group consisting of urea-formaldehyde resins and melamine-formaldehyde resins, in a volatile organic dispersion medium, and 1%–5% of a phosphoric acid derivative of a saturated hydroxy aliphatic ester containing 4–8 carbon atoms, wherein said hydroxy group is attached to the acid portion of said ester.

3. A coating composition comprising an urea-formaldehyde resin, in a volatile organic dispersion medium, an oil-modified alkyd resin dispersion, and 0.2–5.0% of the composition comprising a phosphoric acid derivative of a saturated hydroxy aliphatic ester containing 4–8 carbon atoms, wherein said hydroxy group is attached to the acid portion of said ester.

4. A low temperature baking coating composition comprising an urea-formaldehyde resin in a volatile organic dispersion medium, an oil-modified alkyd resin dispersion, and 1%–5% of a phosphoric acid derivative of a saturated hydroxy aliphatic ester containing 4–8 carbon atoms, wherein said hydroxy group is attached to the acid portion of said ester.

5. A coating composition comprising an urea-formaldehyde resin in a volatile organic dispersion medium, and 1%–5% of a phosphorus pentoxide derivative of a saturated hydroxy aliphatic ester containing 4–8 carbon atoms, wherein said hydroxy group is attached to the acid portion of said ester.

6. A coating composition comprising an urea-formaldehyde resin in a volatile organic dispersion medium, and 1%–5% of a phosphorus pentoxide derivative of ethyl lactate.

7. A coating composition comprising an urea-formaldehyde resin in a volatile organic dispersion medium, an oil-modified alkyd resin dispersion, and 0.2-5% of a phosphorus pentoxide derivative of a saturated hydroxy aliphatic ester containing 4-8 carbon atoms, wherein said hydroxy group is attached to the acid portion of said ester.

8. A low temperature baking coating composition comprising an urea-formaldehyde resin in a volatile organic dispersion medium, an oil-modified alkyd resin dispersion, and 1%-5% of a phosphorus pentoxide derivative of a saturated hydroxy aliphatic ester containing 4-8 carbon atoms, wherein said hydroxy group is attached to the acid portion of said ester.

JACK T. THURSTON.

REFERENCES CITED

The following references are of record in the file of this patent:

UNITED STATES PATENTS

| Number | Name | Date |
| --- | --- | --- |
| 2,274,447 | Hodgins et al. | Feb. 24, 1942 |
| 2,384,117 | Muskat et al. | Sept. 4, 1945 |

FOREIGN PATENTS

| Number | Country | Date |
| --- | --- | --- |
| 410,200 | Canada | Jan. 26, 1943 |